US00RE34388E

United States Patent [19]

Dubin et al.

[11] E Patent Number: Re. 34,388

[45] Reissued Date of Patent: Sep. 28, 1993

[54] METHOD AND APPARATUS FOR DETECTING STALLS

[75] Inventors: Murray L. Dubin, Peabody; Linda J. Smith, Danvers, both of Mass.

[73] Assignee: General Electric Company, Cincinnati, Ohio

[21] Appl. No.: 872,207

[22] Filed: Apr. 23, 1992

Related U.S. Patent Documents

Reissue of:

[64] Patent No.: 5,012,637
Issued: May 7, 1991
Appl. No.: 337,690
Filed: Apr. 13, 1989

[51] Int. Cl.[5] ..... F02C 9/00

[52] U.S. Cl. ..... 60/39.02; 60/39.24; 364/431.02

[58] Field of Search ..... 60/39.02, 39.24, 39.281, 60/39.29; 364/431.02

[56] References Cited

U.S. PATENT DOCUMENTS

| | | | |
|---|---|---|---|
| 3,098,356 | 7/1963 | Joline | 60/39.281 |
| 3,852,958 | 12/1974 | Adams et al. | 60/39.281 |
| 3,867,717 | 2/1975 | Moehring et al. | 340/27 SS |
| 4,060,979 | 12/1977 | Elsaesser et al. | 60/39.29 |
| 4,060,980 | 12/1977 | Elsaesser et al. | 60/39.29 |
| 4,118,926 | 10/1978 | Curvino et al. | 60/39.281 |
| 4,216,672 | 8/1980 | Henry et al. | 73/115 |
| 4,581,888 | 4/1986 | Schmitzer et al. | 60/39.091 |
| 4,608,860 | 9/1986 | Charrier et al. | 73/115 |
| 4,622,808 | 11/1986 | Kenison et al. | 60/39.29 |
| 4,655,034 | 4/1987 | Kenison et al. | 60/39.29 |

*Primary Examiner*—Louis J. Casaregola
*Attorney, Agent, or Firm*—Jerome C. Squillaro; Bernard E. Shay

[57] ABSTRACT

A gas turbine engine control system which receives an engine condition and generates a parameter signal representative of the condition. The control system also receives a temperature signal representative of the engine temperature downstream of the engine combustor. A comparator is used to compare the parameter signal with the temperature signal and a nonrecoverable stall output signal is produced when the temperature signal indicates the temperature is greater than a scheduled value for the given parameter signal. The invention also includes a method for monitoring a gas turbine engine comprising the steps of receiving an engine condition and for generating a parameter signal representative of the condition. A temperature signal is received which is representative of the engine temperature downstream of the engine combustor and then the parameter signal and the temperature signal are received and a nonrecoverable stall output signal is produced when the temperature signal indicates the temperature is greater than a scheduled value for the given parameter signal.

4 Claims, 5 Drawing Sheets

METHOD AND APPARATUS FOR DETECTING STALLS

Matter enclosed in heavy brackets [ ] appears in the original patent but forms no part of this reissue specification; matter printed in italics indicates the additions made by reissue.

The invention relates to gas turbine engines and, more particularly, to a method and apparatus for detecting stalls in gas turbine engines.

BACKGROUND OF THE INVENTION

During the operation of an aircraft gas turbine engine a stall phenomena may occur wherein a momentary reversing of the airflow occurs through the compressor. This causes the compressor discharge pressure to decay rapidly and also causes the temperature of the turbine section to increase rapidly. Typically stalls are categorized as either recoverable or "surge" stalls wherein the engine will return to normal operation without operator intervention. Alternatively, stalls are categorized as nonrecoverable stalls, typically considered "hung" or "rotating" stalls, and these types of stalls typically require operator intervention to clear to stall and to prevent temperatures from becoming excessive within the engine. Therefore, the ability to determine whether a stall is recoverable or nonrecoverable can provide valuable information to the operator of the aircraft to allow the operator to take appropriate corrective action. There have been numerous methods developed to determine whether a stall condition exists. Typically, the compressor discharge pressure is monitored and when the pressure rapidly drops this provides an indication of a stall. However, merely monitoring this pressure fails to indicate whether the stall is recoverable or nonrecoverable. Likewise, other methods of stall detection have been considered, however methods to differentiate recoverable from nonrecoverable stalls have remained elusive. Therefore, it would be desirable to have a stall detection method and apparatus which provides an indication when a stall is nonrecoverable.

SUMMARY OF THE INVENTION

A gas turbine engine control system comprising a means for detecting an engine condition and for generating a parameter signal representative of the condition. The control system has a means for receiving a temperature signal representative of the engine temperature downstream of the engine combustor. A comparator means for receiving both the parameter signal and the temperature signal and produces a nonrecoverable stall output signal when the temperature signal indicates the temperature is greater than a predetermined value for the given parameter signal. The invention also includes a method for monitoring a gas turbine engine comprising the steps of receiving an engine condition and for generating a parameter signal representative of said condition, receiving a temperature signal representative of the engine temperature downstream of the engine combustor and receiving said parameter signal and said temperature signal and producing a nonrecoverable stall output signal when the temperature signal indicates the temperature is greater than a scheduled value for the given parameter signal.

DETAILED DESCRIPTION OF PREFERRED EMBODIMENTS

Figure 1:
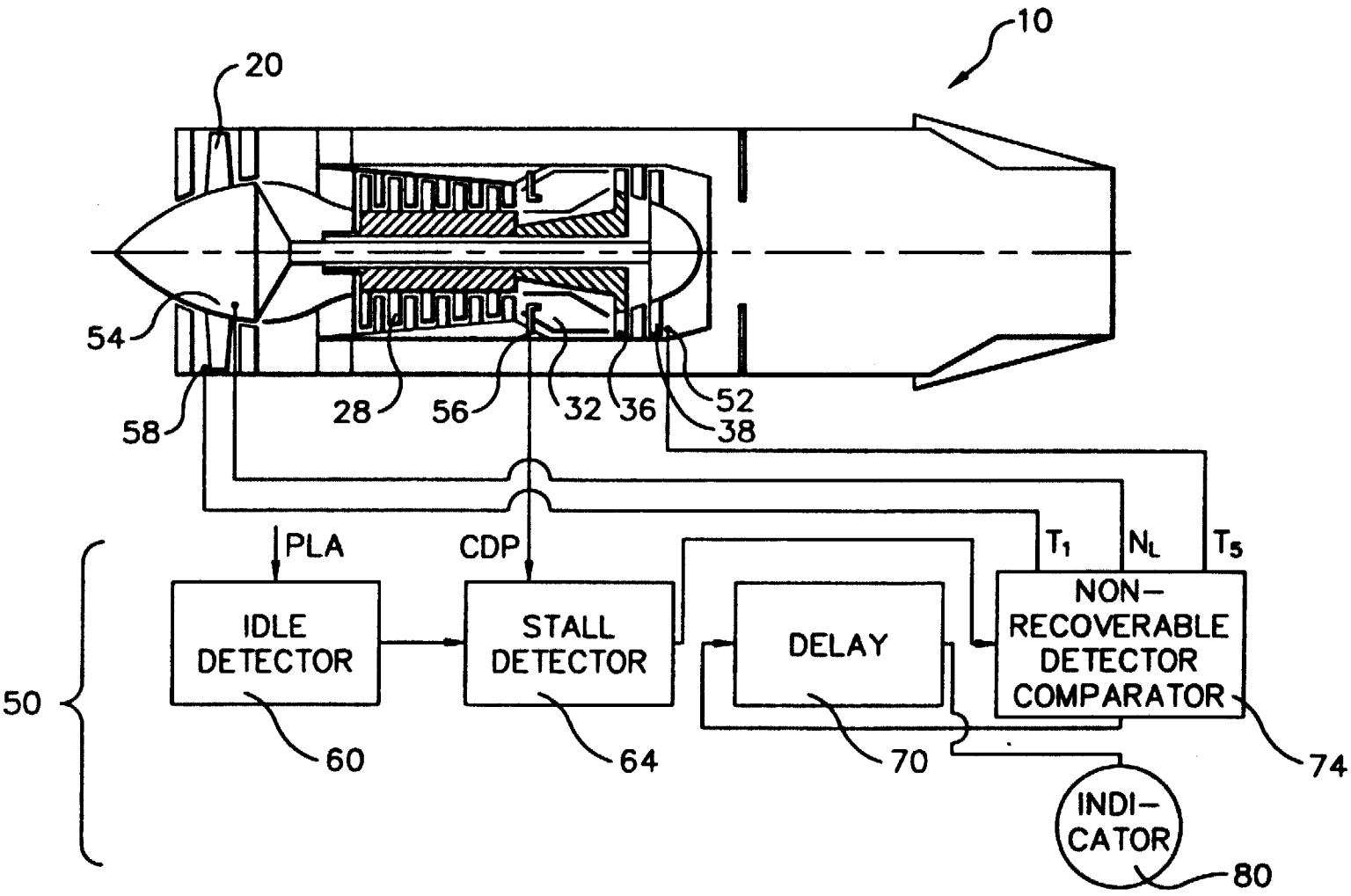
FIG. 1 is a schematic cross section of an exemplary gas turbine engine to which the control means of the present invention relates.

Referring initially to FIG. 1, one form of a gas turbine engine to which the present invention relates is generally designated as 10. The gas turbine engine comprises a first compressor or fan 20 which produces a downstream flow, a second compressor 28 is positioned downstream of the first compressor 20, a combustor region 32 is positioned downstream of the second compressor 28, first and second turbines 36 and 38 respectively, are positioned downstream of the combustor region 32. A control system 50 receives inputs such as from a temperature sensor 52, a fan speed sensor 54, a compressor discharge pressure sensor 56 an engine inlet temperature sensor 58 and a power level angle (PLA). The control system 50 has an idle detector means 60 which has a means for receiving the input representative of the PLA or other desired thrust indicator and the idle detector means 60 then compares the PLA with a standard value and produces an output indicating when the PLA is set for equal to or greater than idle. The idle detector means 60 is coupled to a means for detecting stall 64 such at if the idle detector means 60 output indicates that the PLA is equal to or greater than idle then the controller actuates the stall detection means 64. The stall detection means 64 typically has a means for receiving a signal from the compressor discharge pressure sensor 56. The stall detection means 64 produces an output indicating that an engine stall has occurred. The stall output is coupled to a [delay means 70 which is coupled to a] comparator means 74 such that if the stall output indicates the engine has stalled the controller [after a delay] fully activates the comparator means 74. The comparator means 74 serves as a means for comparing engine conditions with a schedule to detect whether the engine is in a nonrecoverable stall.

The comparator means 74 typically has a means for receiving at least a first, a second, and a third engine condition signal. The comparator means 74 obtains a scheduled value by comparing a first parameter, which is based on at least one of the engine condition signals, to a schedule. The scheduled value is then compared with a second parameter which is typically a temperature parameter based on a condition signal representative of the engine temperature downstream of the combustor. The comparator means 74 then produces a nonrecoverable stall output when the relationship of the scheduled value to the second parameter indicates a nonrecoverable stall. Typically, a stall is indicated when the temperature parameter is greater than the scheduled value. The nonrecoverable stall output is then typically coupled *to a delay means 70 which is coupled* to a nonrecoverable stall indicating means 80.

The controller of the present invention may be any control means such as analog or digital controller. Further, the controller may be located in the mainframe of an aircraft which receives engine signals. Alternatively, the controller may be implemented by an engine control system such as a fully authority digital electronic control (FADEC). The idle detection means 60, stall detection means 64, delay means 70, and comparator means 74, are preferable implemented through a software algorithm in the control system 50.

Figure 2:
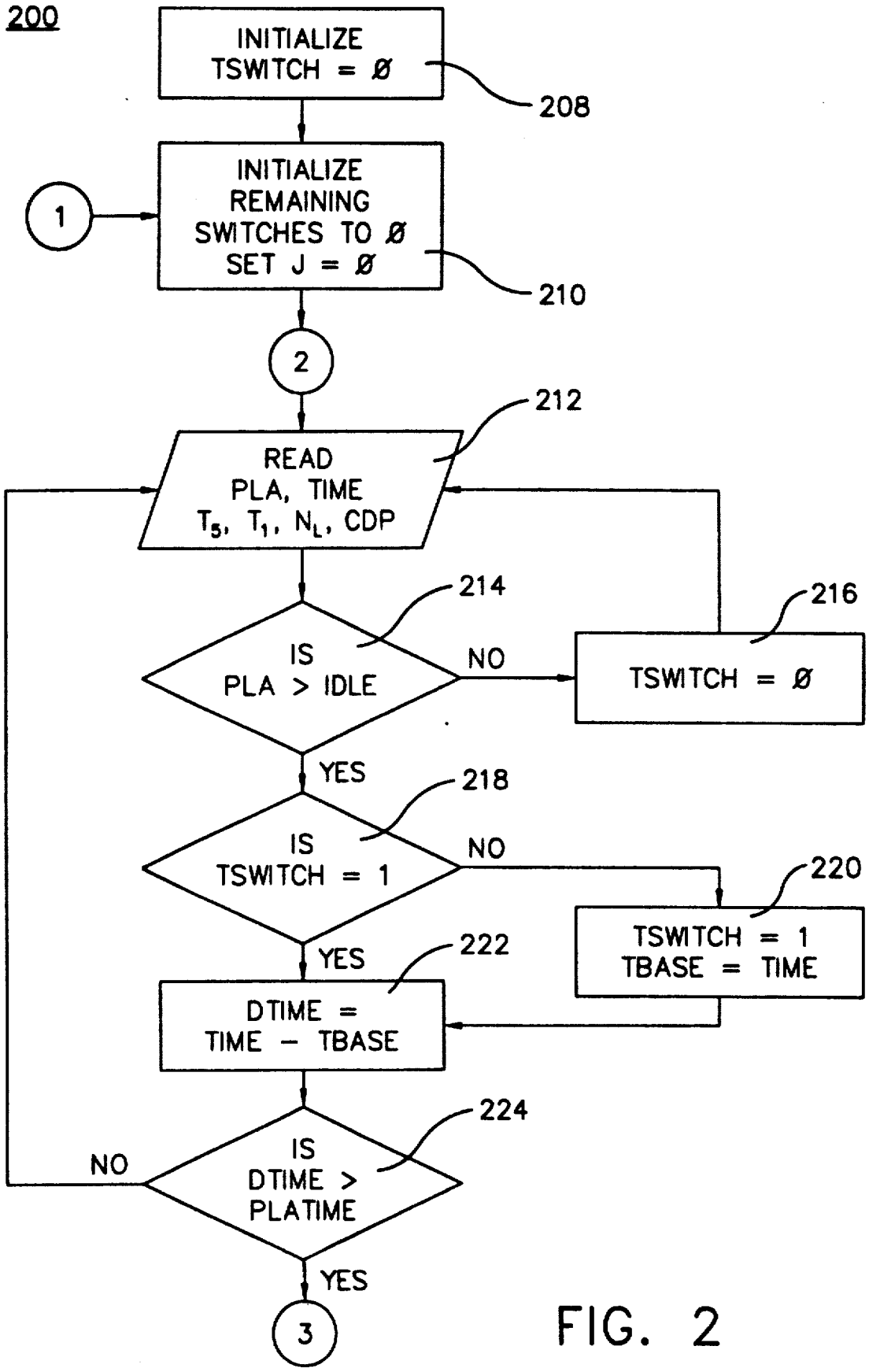
FIGS. 2 to 4 are schematic diagrams of one embodiment of an algorithm of a control system of the present invention.

In FIG. 2 one embodiment of an idle detection algorithm 200 which serves as the idle detection means is depicted. In command block 208 a time switch (TSWITCH) is initialized to zero and then in command block 210 the remaining parameters are initialized to zero and then as denoted in input block 212 operating conditions such as PLA, time, temperatures, compressor discharge pressure (CDP), and fan speed are read. Input block 212 is coupled to decision block 214 which compares whether the PLA is equal to or greater than idle. If the PLA is not equal to or greater than idle then the algorithm switches to command block 216 which sets the time switch equal to 0 and then the algorithm switches back to input block 212. However, if decision block 214 indicates that the PLA is equal to or greater then idle then the algorithm switches to decision block 218 which compares whether the time switch is equal to one. If the time switch is not equal to one then the algorithm switches to command block 220 which sets a time base (TBASE) equal to the current time and sets the time switch equal to one. Alternatively, if decision block 218 determines that the time switch is equal to one or after command block 220 sets the time switch to one then control transfers to command block 222 which subtracts the time base from the current time to obtain a time delay (DTIME). Command block 222 is coupled to decision block 224 which compares whether the time delay has exceeded a specified period of time (PLA Time) which is typically about sixty seconds. If the time delay has not exceeded the specified period of time then the algorithm switches back to input block 212. However, if the decision block 224 determines that the time delay has exceeded the specified period of time then the algorithm switches control to decision block 310 of FIG. 3, as denoted by circle 3.

Basically, the idle detection algorithm 200 initializes the system in command block 208 and 210 and then reads various operating conditions and checks whether the power lever angle (PLA) is equal to or greater than idle in decision block 214. If the PLA is not equal to or greater than idle then the system keeps checking the parameters until the PLA is equal to or greater than idle. After the PLA is determined to be greater than idle then the control turns on a time counter in block 220 and continues to recheck parameters for a period of time such as 60 seconds for the engine to reach normal engine operating conditions until the system begins checking for a stall as depicted in decision block 224. By delaying stall detection checks until a period at or after idle this eliminates many false stall indications such as might occur during starting a gas turbine engine.

Figure 3:
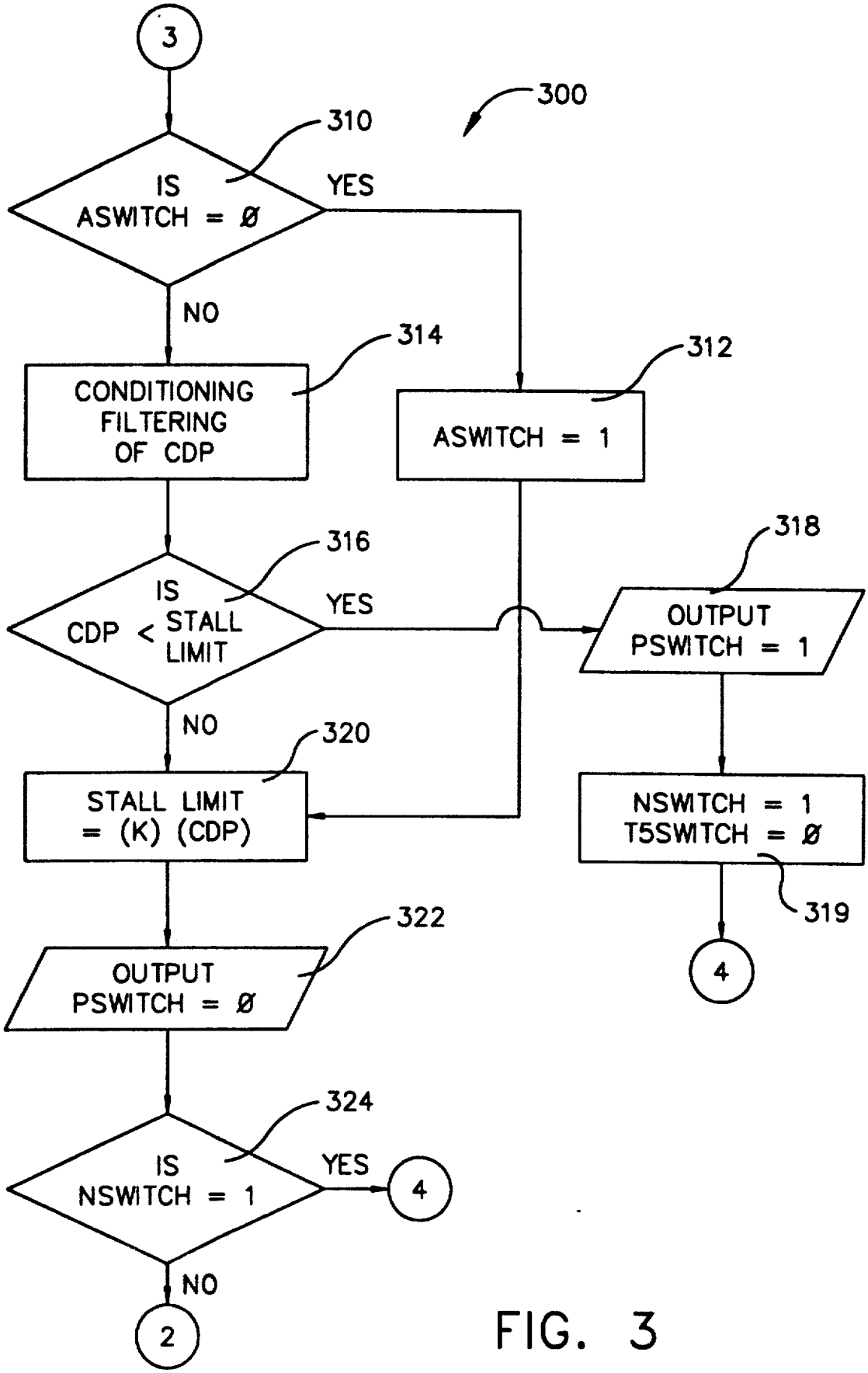

In FIG. 3 a stall detection algorithm generally designated as 300 is depicted. In decision block 310 the algorithm compares whether a stall limit switch (ASWITCH) is equal to zero. If the stall limit set switch is equal to zero then the algorithm switches to command block 312 in which the stall limit switch (ASWITCH) is set to one. Alternatively, if decision block determines that the stall limit switch is not zero then the algorithm switches to command block 314 which provides conditioning and filtering of the compressor discharge pressure signal such as by placing a maximum and minimum authority limits on the magnitude of positive or negative incremental changes in compressor discharge pressure (CDP) thereby preferably filtering out spurious spikes in the CDP signal. The authority limits are determined, in part by the sampling rate and the dynamic response of the control system. The output of command block 314 is coupled to decision block 316 which compares whether the compressor discharge pressure (CDP) is less than a stall limit (STLIM) for the compressor discharge pressure. If the CDP is less than the stall limit then the algorithm switches to output block 318 and a surge stall switch (PSWITCH) is set to one. Output block 318 is coupled to command block 319 in which a nonrecoverable stall detection switch (NSWITCH) is also set to one and a nonrecoverable stall time switch (T5SWITCH) is set to zero. Command block 319 is coupled to command block 410 of FIG. 4 as denoted by circle 4. If decision block 316 determines that the CDP is not less than the stall limit then the algorithm switches to command block 320 which sets the stall limit. Command block 312 also is coupled to command block 320 and in this case the stall limit is initially set. Typically, the stall limit is set to a specified percentage of the compressor discharge pressure where the specified percentage is designated as K in FIG. 3 and K is dictated by the control system data sampling rate and by the dynamics of the compressor discharge pressure sensing system. Command block 320 is coupled to output block 322 in which a surge stall switch (PSWITCH) is set to zero. Output block 322 is coupled to decision block 324 in which the recoverable stall logic detection switch is compared to whether the switch equals one. If the nonrecoverable stall logic detection switch does not equal one then the algorithm switches back to input block 212 of FIG. 2 as denoted by circle 2, and the parameters are reread. Alternatively, if the switch is equal to one then the algorithm switches to command block [41.0] *410* of FIG. 4, designated by circle 4.

Thus, the stall detection algorithm first sets a stall limit based on a percentage of the CDP through command blocks 312 and 320. Output is then provided which indicates that no surge stall exists through output block 322 and then the algorithm checks whether a surge stall has been previously indicated by decision block 324. Subsequently the algorithm compares the engine's CDP with the stall limit to determine whether the engine's CDP has fallen below the stall limit value through command block 316. If [the engine] *CDP* has fallen below the stall limit value then a surge stall switch is set to one by output block 322. This switch is typically an operator indicator to provide information to the operator such as through a light or other warning signal. The algorithm in command block 319 then sets switches to [so as to] indicate a surge stall has been detected and to reset switches such that time counters will be initialized to zero [during a] *for the* nonrecoverable stall [detector] *detection* algorithm.

While FIG. 3 provides one possible method of providing a stall indication it should be understood that other stall indication systems are equally applicable to the present invention. As depicted, only when a stall is detected does the control system activate the nonrecoverable comparator means. Since all stalls, whether nonrecoverable or surge, are initially detectable as a surge stall, the stall detector therefore further minimizes the possibility of a false nonrecoverable stall signal. However, the control system of the present invention may also ignore surge stall detection and the nonrecoverable comparator means may be active at all times.

Figure 4:
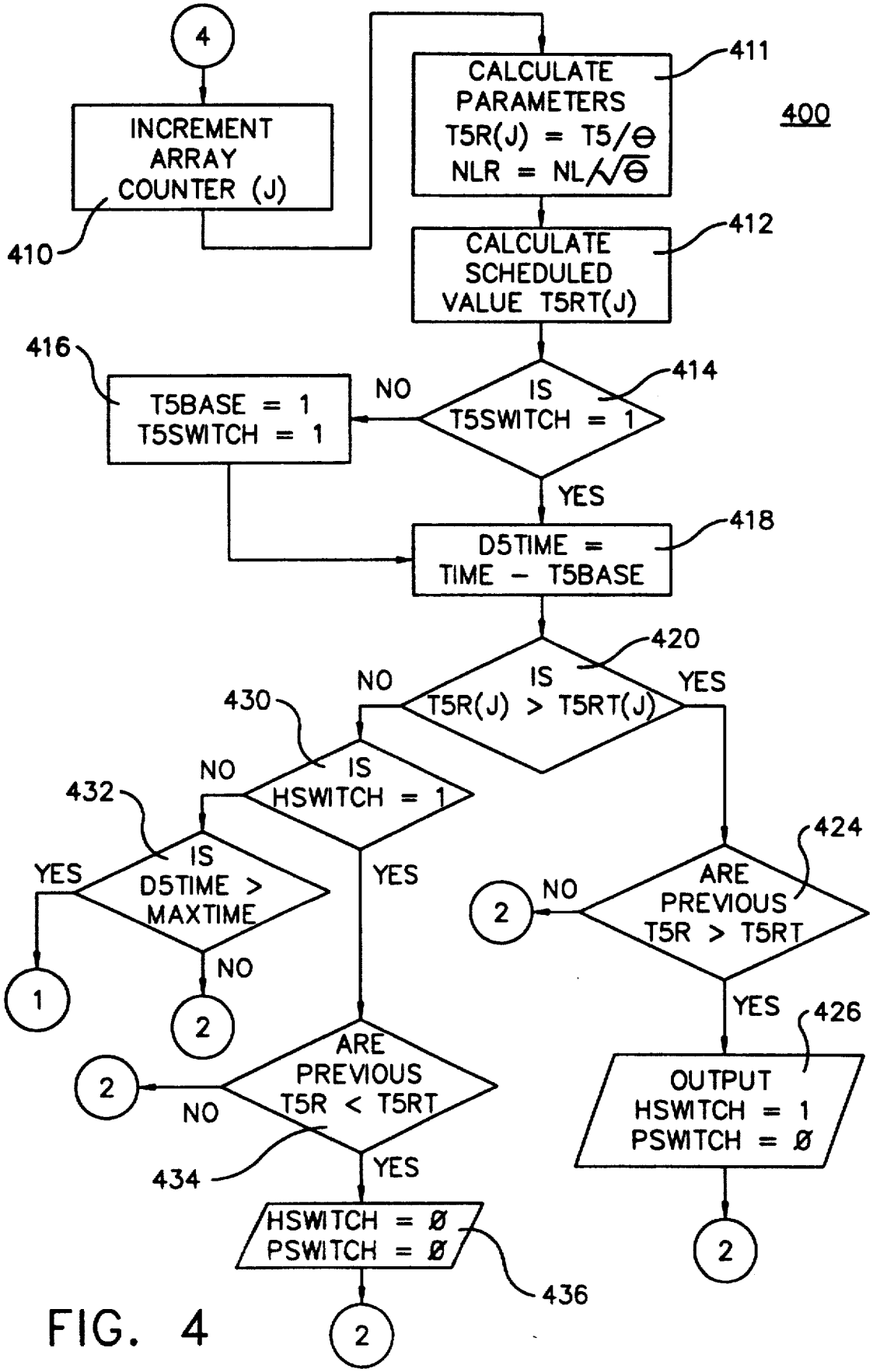
Figure 5:
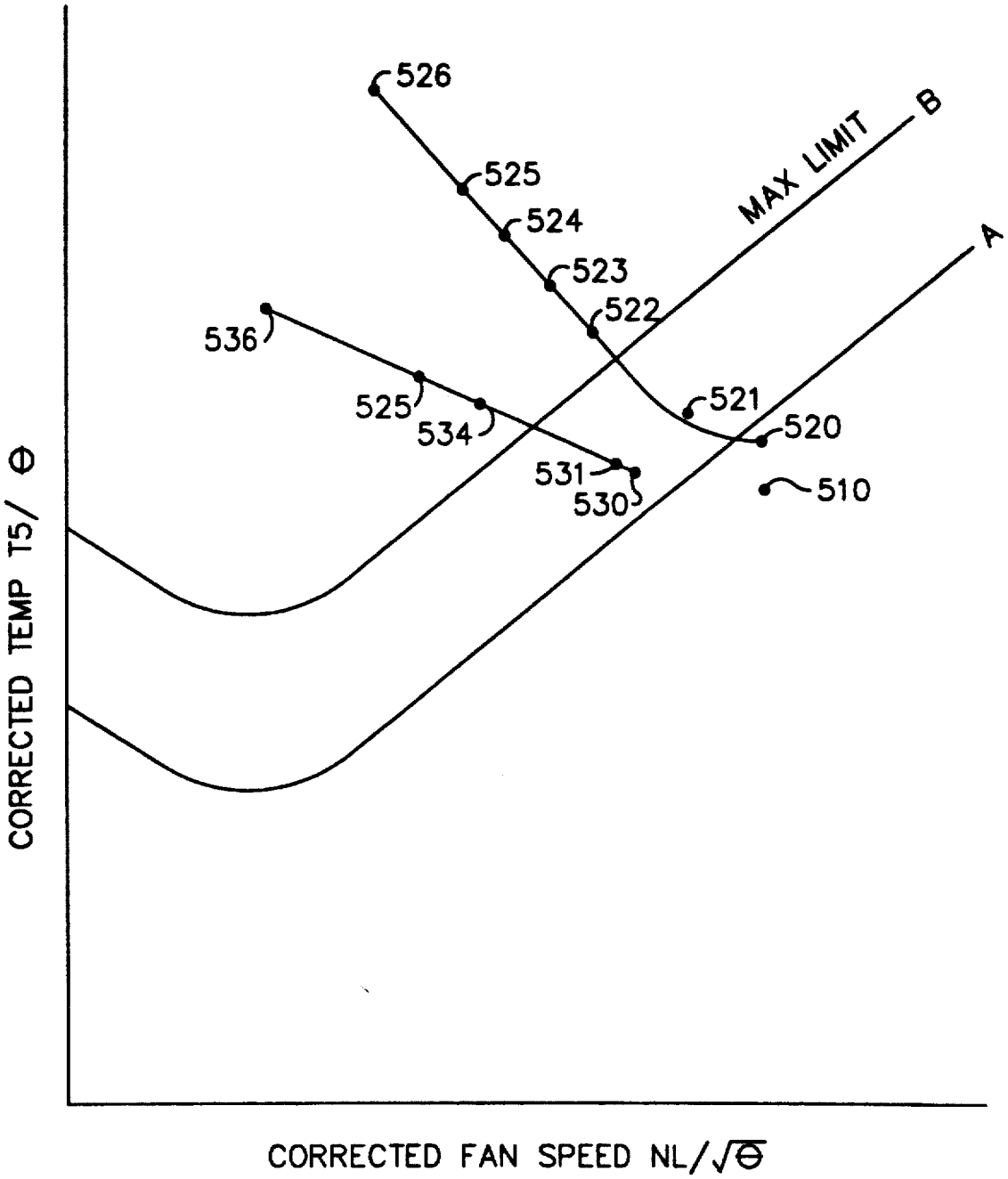
FIG. 5 is a graph depicting recoverable and nonrecoverable stalls.

One embodiment of the nonrecoverable comparator means 400 is depicted as an algorithm in FIG. 4. In FIG. 4 command block 410 increments an array counter designated (J) and command block 410 is coupled to command block 411 which calculates corrected parameters based on engine conditions. In particular, typically an engine temperature parameter (T5R(J)) is calculated by obtaining the engine's low pressure turbine discharge temperature (T5) divided by theta wherein theta is the engine inlet temperature (T1) in degrees Rankine (°R) divided by the standard day temperature in degrees Rankine. The particular engine parameter is then stored such as to correspond to a particular array position (J). The engine's speed parameter (NLR) is calculated by obtaining the engine's rotational speed typically the fan speed (NL) divided by the square root of theta. Command block 411 is coupled to command block 412 in which one parameter is compared to a schedule to obtain a maximum scheduled value for the other parameter. For example, typically the speed parameter (NLR) is compared to the schedule and a maximum temperature scheduled value (T5RT(J)) is obtained. The schedule is obtained preferably by plotting various recoverable stalls and nonrecoverable stall conditions of a given engine. For example, as shown in FIG. 5 a schedule is depicted in which corrected low pressure turbine discharge temperature is plotted versus fan speed. Line A depicts a line below which it has been determined, through experimentation, that most recoverable stalls occur. Such a recoverable stall is represented by point 510. Line B represents a line above which through experimentation the stalls can be considered nonrecoverable. Such a nonrecoverable stall is represented by a trace of points 520 to 526 and 530 to 536 moving as a function of time. It should be noted that for each of the nonrecoverable stalls the temperature increases rapidly with time. However, initially the temperatures for the nonrecoverable stalls may be at or near those of the recoverable stalls. Therefore, once the speed parameter is calculated, the maximum temperature scheduled value may be obtained as the value falling along Line B. This value is then stored such as to correspond to the particular array position (J). While the maximum temperature reference value is exemplified through a scheduled graph, it should be understood that the scheduled value may be calculated by equations representative of maximum values or by other suitable means. Referring again to FIG. 4, command block 412 is coupled to decision block 414 which compares whether the nonrecoverable stall time switch (T5SWITCH) is equal to one. If the nonrecoverable stall time switch is not equal to one then the algorithm switches to command block 416 which sets a nonrecoverable stall time base (T5BASE) equal to the current time and sets the nonrecoverable stall time switch (T5SWITCH) equal to one. Alternatively, if decision block 414 determines that the time switch is not equal to zero or after command block 416 sets the nonrecoverable stall time switch to one then control transfers to command block 418 which subtracts the nonrecoverable stall time base (TBASE) from the current time (TIME) to obtain a nonrecoverable stall detection time (D5TIME). Command block 418 is coupled to decision block 420 which compares whether the temperature parameter (T5R(J)) is greater than the maximum scheduled value T5RT(J) for the current array position (J) and if the temperature parameter T5R(J) is greater than the reference value then the algorithm switches to decision block 424 which compares whether previous values of the calculated parameter T5R are greater than the maximum scheduled values T5RT. For example, the previous array position of the calculated parameter T5R(J-1)) value would be compared with the previous array position of the maximum scheduled value (T5RT(J-1)) and accordingly the values of other array positions would be compared. Typically, between about one to five previous array position values would be compared. By comparing previous values in addition to the current value this protects against random or spurious high temperature signals which can lead to false stall signals. If the previous array position values of the calculated parameter is less than the previous array position values of the predetermined reference value then the algorithm switches back to input block 212 of FIG. 2 as described by circle 2. However, if the decision block determines that the previous calculated parameters is greater than the reference value then the algorithm switches to output block 426 in which a nonrecoverable stall switch (HSWITCH) is set to one and the surge stall switch (PSWITCH) is set to zero. Rather than comparing previous values it may be desirable to delay the algorithm for a period of time before proceeding with the nonrecoverable stall detection logic. It should be understood that the nonrecoverable stall switch may be coupled to any type of indicator system or alternatively may be coupled to the engine control system for corrective action such as shutting down the engine. Output block 426 is then coupled to input block 212 of FIG. 2 as denoted by circle 2. Returning to decision block 420, if however the temperature parameter is less than the scheduled value then the algorithm switches to decision block 430 in which the nonrecoverable stall switch is compared with the value one and if the nonrecoverable stall switch is not equal to one then the algorithm switches to decision block 532 in which the nonrecoverable stall detection time (D5TIME) is compared with a maximum check time (MAXTIME) for nonrecoverable stall. If the nonrecoverable stall detection time is greater than the maximum check time then the algorithm switches to command block 210 in FIG. 2 as denoted by circle 1, alternatively if the nonrecoverable stall detection time is less the the maximum check time then the algorithm switches to input block 212 in FIG. 2 as denoted by circle 2. Maximum check time insures the determination of a nonrecoverable stall even after some rapid corrective action may have been taken in response to a surge stall. For example, resetting the engine to idle from an initially high power setting may transiently result in the temperature parameter being less than the maximum scheduled value within the check time for nonrecoverable stall (MINTIME) but then it increases above the scheduled value shortly thereafter. Typically, the maximum check time is between about 5 and 10 seconds and is generally about 8 seconds. Returning to decision block 430, if the nonrecoverable stall switch (HSWITCH) is equal to one the algorithm then switches to decision block 434 which compares whether previous values of the calculated parameter T5R are less than previous values of the maximum scheduled vale T5RT. By comparing previous values in addition to the current value this also protects against random or spurious low temperature signals which can lead to a false indication that the engine is no longer in a nonrecoverable stall condition.

Therefore, preferably a greater number of previous values are compared to determine that the engine is no longer in a nonrecoverable stall than initially to determine whether the engine is in a nonrecoverable stall as described in decision block 426. Typically, between about five to fifteen previous array position values would be compared. If the previous array position values of the calculated parameter are greater than the previous array position values of the maximum scheduled value then the algorithm switches back to input block 212 of FIG. 2 as denoted by circle 2. However, if the previous calculated parameters are less than the reference value then the algorithm switches to output block 436 in which a nonrecoverable stall switch (HSWITCH) is set to zero and the surge stall switch (PSWITCH) is set to zero. Output block 436 is then coupled to input block 212 of FIG. 2 as denoted by circle 2.

Thus, the nonrecoverable comparator means may be an algorithm in which engine parameters are calculated based on engine conditions as in command blocks 411 and 412. These engine parameters which are typically based on temperature and engine rotational speed are then compared with a schedule to determine whether, at the given rotational speed, the temperature exceeds the scheduled value as exemplified by block 412 and therefore a nonrecoverable stall exits. Once a nonrecoverable stall is detected the control delays indicating the stall condition for a period of time such as by sampling previous values to insure that a nonrecoverable condition exits in previous samples as in decision block 424 and if these samples indicate a nonrecoverable stall condition also then the system provides an output indicating a nonrecoverable stall condition exists as in output block 426. Alternatively, if a nonrecoverable stall is not detected then parameters values are compared with previous maximum scheduled values and if the parameter values are less than the scheduled values then the stall indicators are cleared as in blocks 434 and 436. Once the indicators have been cleared, the system continues to check for a period of time to insure that the nonrecoverable stall situation does not develop as denoted in blocks 414, 416, 418, 430 and 432, and when a maximum time is exceeded the switches are initialized to zero.

While certain preferred features of the invention have been illustrated, it should be understood that the invention is equally applicable to other embodiments. For example, other surge stall detectors, delay means, or other algorithms or hardware may be used. It is therefore understood that the attached claims are intended to cover these and other such modifications and changes that fall within the true spirit of the invention.

We claim:

1. A gas turbine engine control system for use on a gas turbine engine including a fan and a combustor;

means for receiving a first signal indicative of engine speed and proportional to said speed;

means for receiving a temperature signal representative of the engine temperature downstream of said engine combustor;

comparator means for receiving said first signal and said temperature signal and for producing a nonrecoverable stall output signal when said temperature signal indicates the temperature is greater than a scheduled value for the given first signal; and delay means for delaying said nonrecoverable stall output signal for a predetermined period of time, said delay means including a means for comparing a predetermined number of previous values of said temperature signal and said scheduled value and delaying said nonrecoverable output stall signal until said previous temperature signals indicate that the previous temperatures are greater than the previous scheduled values.

2. A method for monitoring a gas turbine engine comprising the steps of:

receiving an engine condition and generating a parameter signal representative of said condition;

receiving a temperature signal representative of an engine temperature downstream of one engine combustor; and receiving said parameter signal and said temperature signal and producing a nonrecoverable stall output signal when said temperature signal indicates that said temperature is greater than a scheduled value for the given parameter signal; and comparing previous values of said temperature signal and said scheduled value and delaying said nonrecoverable stall output signal until said previous temperature signal indicates the previous temperatures are greater than the previous scheduled values.

3. The method of claim 2 wherein said engine is a turbofan engine having a fan thereon and said engine condition is the rotational speed of said fan.

4. The engine control system of claim 1 wherein said engine is a turbofan engine having a fan thereon and said first signal is the rotational speed of said fan.

* * * * *